United States Patent
Ritter et al.

(10) Patent No.: US 7,324,360 B2
(45) Date of Patent: Jan. 29, 2008

(54) POWER CONVERTER METHODS AND APPARATUS FOR VARIABLE SPEED HIGH POWER MACHINES

(75) Inventors: Allen Michel Ritter, Roanoke, VA (US); Richard S. Zhang, Rexford, NY (US); Luis Jose Garces, Niskayuna, NY (US); Rajib Datta, Niskayuna, NY (US); Ravisekhar Nadimpalli Raju, Clifton Park, NY (US); Mark E. Shepard, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 124 days.

(21) Appl. No.: 11/251,727

(22) Filed: Oct. 17, 2005

(65) Prior Publication Data
US 2007/0086221 A1    Apr. 19, 2007

(51) Int. Cl.
*H02M 7/00* (2006.01)

(52) U.S. Cl. .............................. 363/71; 363/65; 363/37

(58) Field of Classification Search ............ 363/34–41, 363/132, 127, 131, 65, 71, 98; 318/801, 318/803, 811, 700
See application file for complete search history.

(56) References Cited

U.S. PATENT DOCUMENTS

| 5,621,628 | A | 4/1997 | Miyazaki et al. |
| 5,742,493 | A | 4/1998 | Ito et al. |
| 6,229,722 | B1 * | 5/2001 | Ichikawa et al. ............. 363/71 |
| 6,487,096 | B1 * | 11/2002 | Gilbreth et al. ............... 363/35 |
| 6,858,997 | B1 | 2/2005 | Poindexter |

* cited by examiner

*Primary Examiner*—Rajnikant B. Patel
(74) *Attorney, Agent, or Firm*—Armstrong Teasdale LLP

(57) ABSTRACT

Methods and apparatus for converting power from a power source are described. In one example embodiment, the method includes controlling multiple transformer and switchgear units coupled to a power source, and controlling multiple converter units connected in parallel. Each converter unit is coupled to a respective one of the transformer and switchgear units to form an individual thread. The transformer and switchgear unit and power converters are controlled so that the carrier waveforms for each individual thread are interleaved between each other over a carrier cycle.

18 Claims, 3 Drawing Sheets

POWER CONVERTER METHODS AND APPARATUS FOR VARIABLE SPEED HIGH POWER MACHINES

BACKGROUND OF THE INVENTION

This invention relates generally to power converters and more particularly, to power converters that enable variable speed operation of electrical machines at very high power and relatively high frequency.

Semiconductor switches capable of handling high currents and voltages (high currents and voltages typically are in excess of 200 amps and 500 volts) typically cannot be switched at high frequency (high frequencies typically are in excess of 5000 Hertz due to thermal limitations. As a result, harmonic content of power processed by high power converters is high and significant filtering generally must be performed before the power signal is applied to an electrical machine or to a power grid. Such filtering adds to the costs and adversely impacts the efficiently of such converters.

As one example application, high power typically is required by motor drives. With motor drives, however, torque ripple may be generated by the drive, which can result in harmonic content in the power applied to the motor. In addition, noise injected into the power grid may result in further degradation in the power applied to the motor. Such harmonic content and noise can lead to degradation of various components sensitive to low cycle fatigue.

One known converter configuration includes multiple single-phase converter modules connected in series to an attempt to increase the voltage level and improve power quality by adding more levels in the voltage waveform. This type of configuration is commonly referred to as a series stacked converter. With such a series stacked converter, however, harmonic content also is passed in series from module to module, and significant filtering typically is performed before the resulting power signal is applied to an electrical machine or to a power grid.

BRIEF DESCRIPTION OF THE INVENTION

In one aspect, a method for converting power from a power source is provided. The method includes controlling multiple transformer and switchgear units coupled to a power source, and controlling multiple converter units connected in parallel. Each converter unit is coupled to a respective one of the transformer and switchgear units to form an individual thread. The transformer and switchgear unit and power converters are controlled so that the carrier waveforms for each individual thread are interleaved between each other over a carrier cycle.

In another aspect, a power converter system is provided. The system includes a plurality of grid side transformer and switchgear units, and a plurality of converter units. Each one of the converter units is coupled to a respective one of the transformer and switchgear units. Each converter unit includes an inverter. The system further includes a master controller coupled to the transformer and switchgear units and to the converter units. Each coupled pair of transformer and switchgear units and converter units forms a thread. The master controller is configured to control interleaving of carrier waveform signals from the threads.

In yet another aspect, a master controller for a power converter system is provided. The power converter system includes a plurality of grid side transformer and switchgear units and a plurality of converter units. Each one of the converter units is configured to be coupled to a respective one of the transformer and switchgear units. Each coupled pair of transformer and switchgear units and converter units forms a thread. The master controller includes a processor configured to control interleaving of carrier waveform signals from the threads so that carrier waveform signals for the threads are interleaved between each other evenly over a carrier cycle.

DETAILED DESCRIPTION OF THE INVENTION

Specific embodiments of power converters are described herein. Such specific embodiments are described by way of example only, and additional power converter configurations are possible. Generally, the power converter configurations described herein include multiple threads of back-to-back power converters connected in parallel on the machine side through differential mode reactors or a combination of differential mode reactors and common mode reactors. The machine may have a three-phase winding or multiple three phase windings. On the grid side, the converters are connected through isolating transformers. The individual converters are switched at a selected frequency. By interleaving the switching patterns between the individual threads, high power quality output can be obtained at both the machine side and the grid side.

Figure 1:
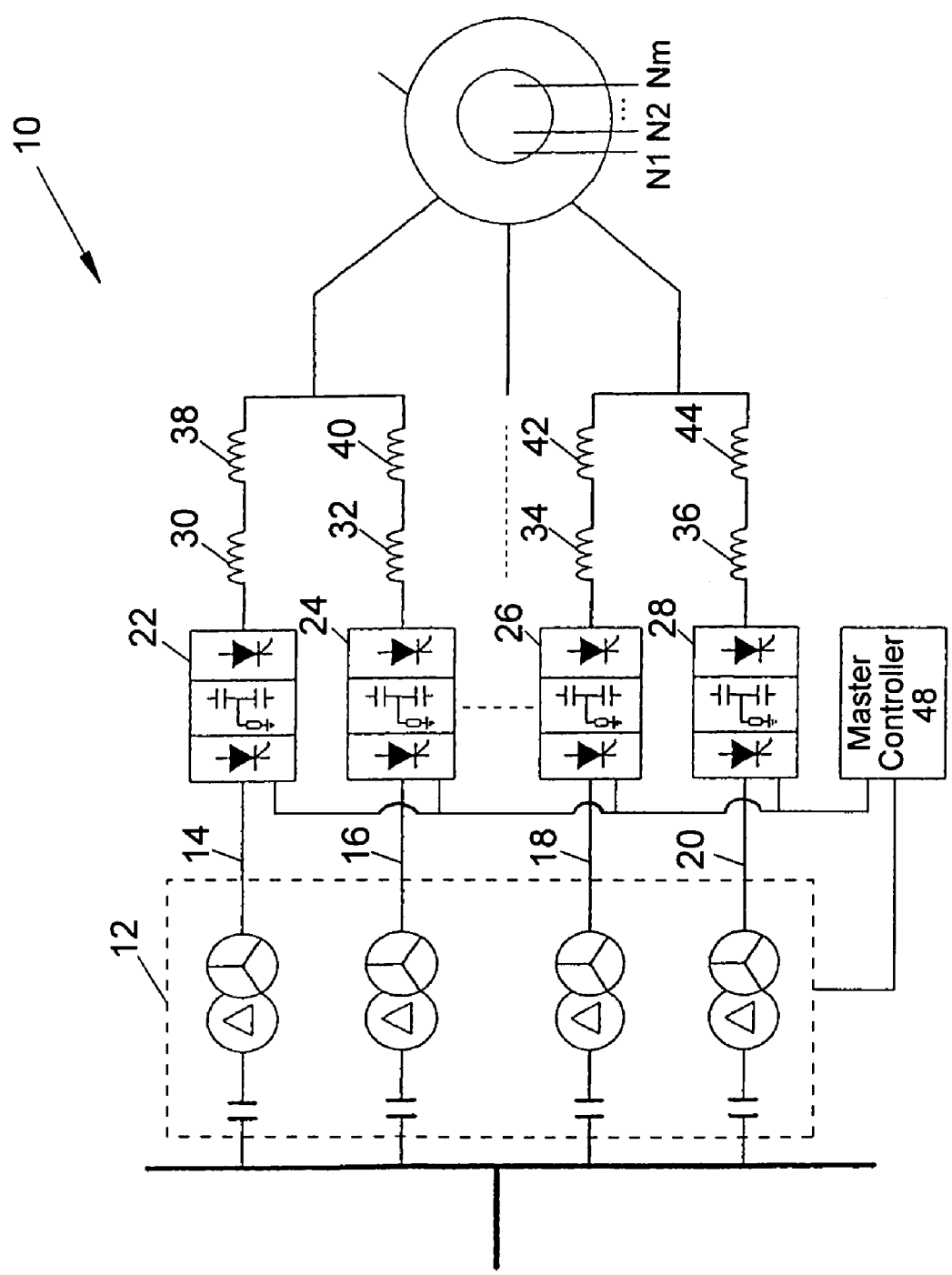
FIG. 1 is a schematic illustration of one embodiment of a power converter system.

FIG. 1 is a schematic illustration of one embodiment of a power converter system 10. Converter system includes a grid side transformer and switchgear unit 12 that, in the embodiment illustrated in FIG. 1, form four parallel threads 14, 16, 18 and 20. Transformer and switchgear unit 12 is well known in the art and is commercially available from, for example, ABB, Alstom, Siemens, and/or General Electric Company.

Each thread 14, 16, 18 and 20 also includes a thread controller 22, 24, 26 and 28 (sometimes referred to herein as a converter unit) coupled to a series connected differential mode reactor 30, 32, 34 and 36 and common mode reactor 38, 40, 42 and 44. In an alternative embodiment, thread controllers 22, 24, 26, and 28 are not coupled to common mode reactors 38, 40, 42, and 44.

Thread controllers, or converter units, 22, 24, 26 and 28 are well known in the art and are commercially available from, for example, ABB, Alstom, Siemens, and/or General Electric Company.

Each thread controller 22, 24, 26 and 28 includes an inverter. Each thread 14, 16, 18 and 20 is coupled to individual sets of the three phase machine windings of a machine 46, which is a synchronous machine with multiple three-phase windings. Machine 46 may, alternatively, by an asynchronous machine with multiple three-phase windings. In FIG. 1, the machine winding neutrals are shown as being isolated. The neutral windings may, however, be connected together but isolated from ground or connected together and connected to ground.

A master controller 48 is coupled to unit 12 and to each thread controller 22, 24, 26 and 28. Master controller 48, in the example embodiment, is a processor based computer that is programmed to execute a control application. Of course, master controller 48 can have many different configurations and is not limited to being a computer. For example, master controller could be a microprocessor, microcontroller, a microcomputer, a programmable logic controller, an application specific integrated circuit, or any other programmable circuit. Therefore, the term processor, as used herein, is not limited to just those integrated circuits referred to in the art as computers, but broadly refers to microprocessors, microcontrollers, microcomputers, programmable logic controllers, application specific integrated circuits, and other programmable circuits, and these terms are used interchangeably herein.

Master controller 48 regulates directly the controllable machine parameters and communicates appropriate references to thread controllers 22, 24, 26 and 28. Master controller 48 also synchronizes operation of thread controllers 22, 24, 26 and 28. Each individual thread controller 22, 24, 26 and 28 regulates the differential mode and common mode currents in individual threads 14, 16, 18 and 20 and generates the final references for controlling the switching states of the inverters.

In operation, master controller 48 and each thread controller 22, 24, 26 and 28 controls interleaving of threads 14, 16, 18 and 20. More particularly, the carrier waveforms for individual threads 14, 16, 18 and 20 are interleaved between each other evenly over a carrier cycle. For example, with four threads, each carrier is spaced either 90 degrees or 45 degrees (with respect to the carrier cycle) from the carrier in the adjacent thread. This results in an effective switching frequency equal to:

2*(No. of Threads)*(n−1), where n is equal to the number of levels in system.

In general, the phase shift can be between 0 to 180 degrees, with varying implications in the harmonic spectrum of the machine currents. The optimum phase shift will also depend on the number of threads used in the system. Having the threads in parallel results in differential mode voltages between threads or both differential mode and common voltages between threads, depending on the connection in the DC links and/or grid-side transformers. The resulting differential mode and common mode currents, if present, are limited by choice of reactors and the control algorithm.

The system can be designed with each thread controlling its individual current. To facilitate minimizing the effects of the differential and common mode voltages between threads, additional regulators can be added that measure the actual cross currents (currents flowing among the threads and not flowing into the load) and regulate them to zero by adding small voltages corrections to the output of the individual thread current controllers. In another embodiment, a master controller can be used, which regulates the load current directly. The output of this controller will be then sent to each of the threads, where the voltage corrections of the thread cross current regulators will be added and the result used as voltage command in the voltage control. Any of these control methods could be applied to the hardware configurations described herein.

Figure 2:
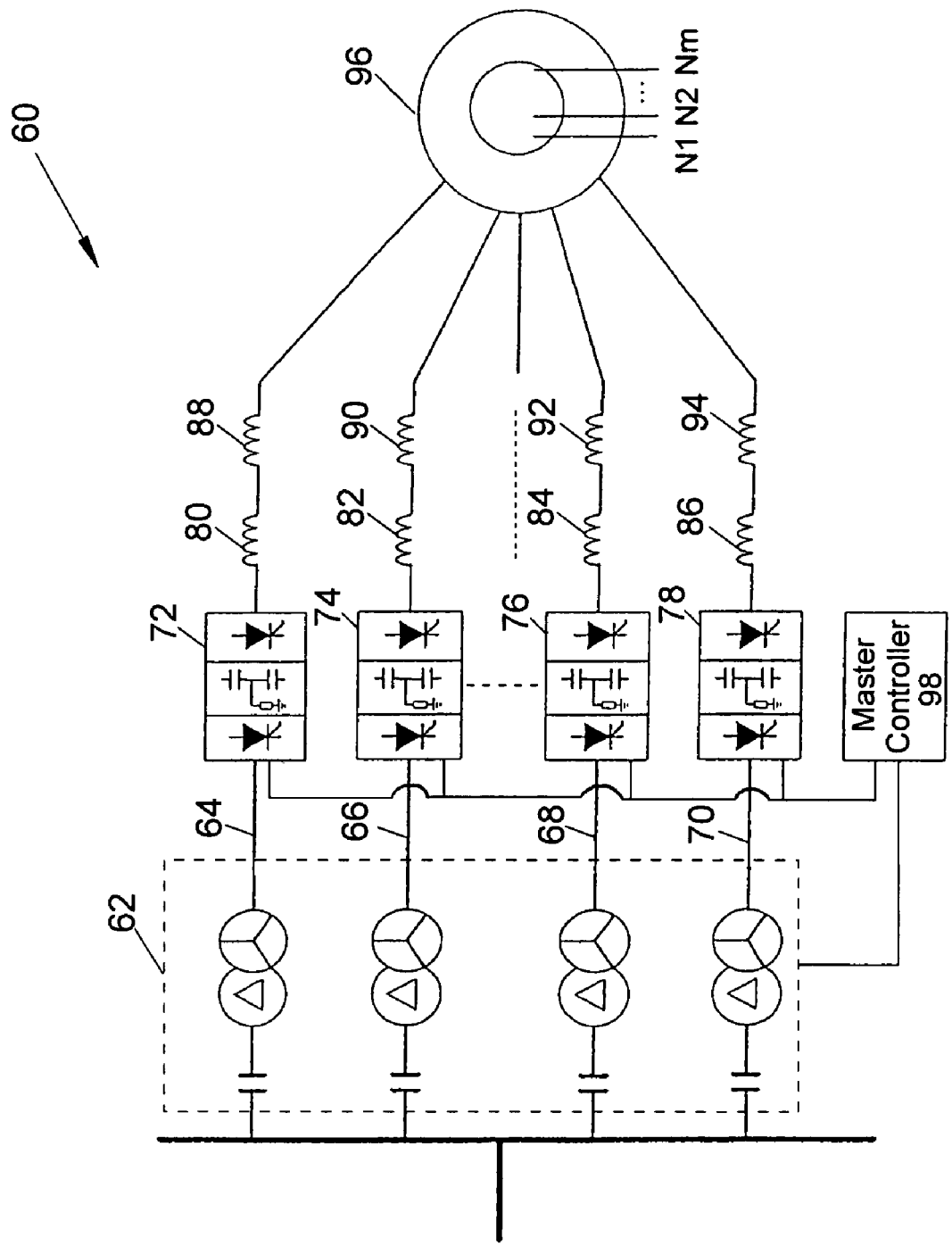
FIG. 2 is a schematic illustration of another embodiment of a power converter system.

FIG. 2 is a schematic illustration of another embodiment of a power converter system 60. Converter system includes a grid side transformer and switchgear unit 62 that, in the embodiment illustrated in FIG. 2, has four parallel threads 64, 66, 68 and 70. Each thread 64, 66, 68 and 70 also includes a thread controller (sometimes referred to herein as a converter unit) 72, 74, 76 and 78 coupled to a series connected differential mode reactor 80, 82, 84 and 86 and common mode reactor 88, 90, 92 and 94. Each thread controller 72, 74, 76 and 78 includes an inverter. Each thread 64, 66, 68 and 70 is coupled to individual sets of three phase machine windings of machine 96, which is a synchronous machine with multiple three-phase windings. Machine 96 may, alternatively, be an asynchronous machine with multiple three-phase windings. In FIG. 2, the machine winding neutrals are shown as being isolated. The neutral windings may, however, be connected together but isolated from ground or connected together and connected to ground. More specifically, in each embodiment, each thread includes each component coupled between the common mode reactor and the respective switchgear unit.

A master controller 98 is coupled to unit 62 and to each thread controller 72, 74, 76 and 78. Master controller 98 regulates directly the controllable machine parameters and communicates appropriate references to thread controllers 72, 74, 76 and 78. Master controller 98 also synchronizes operation of thread controllers 72, 74, 76 and 78. Each individual thread controller 72, 74, 76 and 78 regulates the differential mode and common mode currents in the individual threads 64, 66, 68 and 70 and generates the final references for controlling the switching states of the inverters.

Operation of system 60 is similar to operation of system shown in FIG. 1 except that with system 60, and in addition to the phase shift in the carriers, the fundamental reference voltages are also phase shifted by appropriate phase angles. The phase shift depends on the number of three-phase groups and the particular winding distribution used within the machine. In the exemplary embodiment of system 60, the particular windings are chosen as to minimize the effects of uneven distributions of the magnetic field within the machine air-gap which would result in non sinusoidal BEMF (Back Electro-Magnetic Force) leading to additional losses and uneven torque even under perfect sinusoidal excitation. In one embodiment, for balanced systems, three phase repeats every sixty electrical degrees. In another embodiment, for six phase used with two three-phase groups, thirty degree displacement between each of the three-phase groups enables the repeat rate to double achieve a repeat every thirty degrees.

Figure 3:
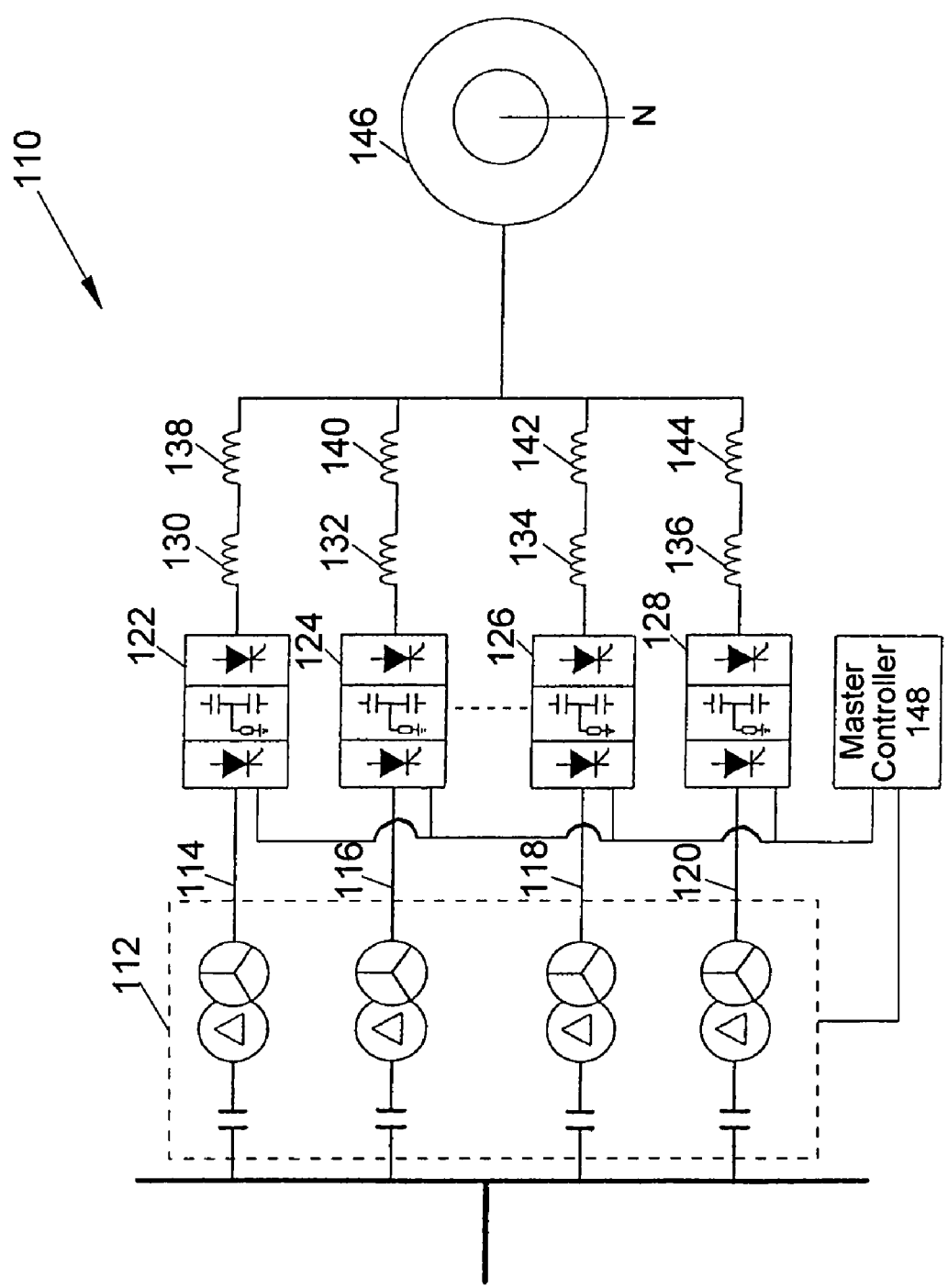
FIG. 3 is a schematic illustration of yet another embodiment of a power converter system.

FIG. 3 is a schematic illustration of yet another embodiment of a power converter system 110. Converter system 110 includes a grid side transformer and switchgear unit 112 that, in the embodiment illustrated in FIG. 2, has four parallel threads 114, 116, 118 and 120. Each thread 114, 116, 118 and 120 also includes inverter units 122, 124, 126 and 128 coupled to a series connected differential mode reactor 130, 132, 134 and 136 and common mode reactor 138, 140, 142 and 144. Each thread 114, 116, 118 and 120 is coupled to the three phase machine winding of a machine 146, which is a three phase synchronous machine. Alternatively, machine 146 may be a three phase asynchronous machine. In FIG. 3, the machine winding neutral is shown as being isolated. The neutral may, however, be connected to ground.

A master controller 148 is coupled to each thread controller 122, 124, 126 and 128. Master controller 148 regulates directly the controllable machine parameters and communicates appropriate references to thread controllers 122, 124, 126 and 128. Master controller 148 also synchronizes operation of thread controllers 122, 124, 126 and 128. Each individual thread controller 122, 124, 126 and 128 regulates the differential mode and common mode currents in the individual threads 114, 116, 118 and 120 and generates the final references for controlling the switching states of the inverters.

Operation of system 110 is similar to operation of system shown in FIG. 1 except that with system 110, and in addition to the phase shift in the carriers, the fundamental reference voltages are also phase shifted by appropriate phase angles. This results in harmonic cancellation in three-phase machine currents due to phase-shifted carriers for each three-phase group and also harmonic cancellation in the air-gap due to phase-shifted fundaments. Accordingly, the addition of phase shifted fundamentals facilitate increasing the repeat rate to effectively cancel lower frequencies.

The above described converter systems facilitate improving the output power quality of very high power converters (i.e., power converters that operate in a range in excess of several hundred KW. Such power quality is achieved by interleaving the switching events between several converter units so that the effective switching frequency as seen by the load is improved by a factor equal to the number of units. The increased "effective" switching frequency results in low output current ripple and in the case of an electrical machine, results in low torque ripple. The systems also facilitate improvement in the power level through paralleling several units, and provides redundancy for machines requiring high availability to operate by allowing the operation under emergency conditions where one or more of the threads fails and is taken out of operation. The system will then operate under reduced power and torque quality, but the total operation does not need to be discontinued.

In addition, such system configurations facilitate reduced current and voltage stresses (dv/dt) in the machine. The high power quality at the machine terminals reduces the stresses in the machine insulation both due to overvoltage and high dv/dt. Such configurations also provide reduced bearing currents in the machine and reduced switching losses in the converter units since the individual converter units can be operated at relatively low switching frequencies while maintaining a high effective system switching frequency. In addition, such configurations facilitate reduced resonance with regard to long cables since the effective interleaved voltage has lower dv/dts and voltage steps of lower amplitude.

While the invention has been described in terms of various specific embodiments, those skilled in the art will recognize that the invention can be practiced with modification within the spirit and scope of the claims.

What is claimed is:

1. A method for converting power from a power source, said method comprising:
    supplying power from the power source through multiple threads coupled in parallel in at least two phases of a load, wherein each thread includes a transformer and switchgear unit coupled in series with a power converter unit; and
    controlling a carrier waveform signal for each individual thread such that the carrier waveform signals are interleaved between each other evenly over a carrier cycle.

2. A method in accordance with claim 1 wherein each converter unit is coupled to a machine through at least one of a differential mode reactor and a continuous mode reactor.

3. A method in accordance with claim 2 wherein the machine is a three phase machine.

4. A method in accordance with claim 2 wherein the machine is a machine with multiple three-phase windings.

5. A method in accordance with claim 1 wherein an effective switching frequency of the converter units is equal to:

$$2*(\text{No. of Threads})*(n-1),$$

where n is equal to the number of levels in system.

6. A method in accordance with claim 1 wherein each carrier waveform is spaced 90 degrees from a carrier waveform in an adjacent thread.

7. A method in accordance with claim 1 wherein each carrier waveform is spaced 45 degrees from a carrier waveform in an adjacent thread.

8. A method in accordance with claim 1 wherein the phase shift can be between 0 to 180 degrees.

9. A power converter system, comprising:
    a plurality of grid side transformer and switchgear units;
    a plurality of converter units, wherein each converter unit is coupled in series to one of said transformer and switchgear units to form a thread, wherein each thread is coupled in parallel in at least two phases of a load, each said converter unit comprising an inverter; and
    a master controller coupled to each thread, wherein said master controller is configured to control interleaving of a plurality of carrier waveform signals from said threads such that carrier waveform signals for said threads are interleaved between each other evenly over a carrier cycle.

10. A system in accordance with claim 9 further comprising at least one of a differential mode reactor and a common mode reactor coupled to said converter unit.

11. A system in accordance with claim 9 wherein said converter unit comprises an inverter.

12. A system in accordance with claim 9 wherein said converter unit is coupled to three phase machine windings of machine.

13. A system in accordance with claim 9 wherein said master controller comprises a processor.

14. A system in accordance with claim 9 comprising four threads, and wherein said master controller controls interleaving of said threads so that each carrier waveform is spaced at least one of 90 degrees and 45 degrees with respect to a carrier cycle from a carrier in an adjacent thread.

15. A system in accordance with claim 14 wherein said converter system operates with an effective switching frequency equal to:

$$2*(\text{Number Of Threads})*(n-1),$$

where n is equal to the number of levels in system.

16. A master controller for a power converter system, the power converter system comprising a plurality of grid side transformer and switchgear units and a plurality of converter units, wherein each one of the converter units is coupled to one of the transformer and switchgear units to form a thread, wherein each thread is coupled in parallel in at least two phases of a load, said master controller comprising a processor configured to control interleaving of a plurality of carrier waveform signals from the threads so that carrier waveform signals for the threads are interleaved between each other evenly over a carrier cycle.

17. A master controller in accordance with claim 16 wherein the system comprises four threads, and wherein said master controller controls interleaving of the threads so that each carrier waveform is spaced at least one of 90 degrees and 45 degrees with respect to a carrier cycle from a carrier in an adjacent thread.

18. A master controller in accordance with claim 16 wherein said master controller controls the power converter system to achieve an effective switching frequency equal to:

$$2*(\text{Number Of Threads})*(n-1),$$

where n is equal to the number of levels in system.

* * * * *